(12) United States Patent
Neier et al.

(10) Patent No.: US 6,923,393 B1
(45) Date of Patent: Aug. 2, 2005

(54) HORIZONTAL FEED MIXER AND METHOD FOR USING SAME

(75) Inventors: Benjamin R. Neier, Dodge City, KS (US); Rodney R. Neier, Dodge City, KS (US); Gregory R. Reimer, Dodge City, KS (US); Brent H. Whitaker, Dodge City, KS (US); Mark T. Cooksey, Dodge City, KS (US); Celso Luis Casale, San Carlos (BR)

(73) Assignee: J-Star Industries, Inc., Ft. Atkinson, WI (US)

( * ) Notice: Subject to any disclaimer, the term of this patent is extended or adjusted under 35 U.S.C. 154(b) by 148 days.

(21) Appl. No.: 10/459,357

(22) Filed: Jun. 11, 2003

Related U.S. Application Data

(60) Provisional application No. 60/390,736, filed on Jun. 21, 2002.

(51) Int. Cl.[7] .............................................. B02C 19/12
(52) U.S. Cl. ..................... 241/30; 241/260.1; 241/605; 366/603
(58) Field of Search ....................... 241/605, 30, 260.1; 366/314, 603

(56) References Cited

U.S. PATENT DOCUMENTS

| | | | |
|---|---|---|---|
| 2,685,900 A | 8/1954 | Cross | |
| 3,638,920 A | 2/1972 | Davis | |
| 4,151,961 A | 5/1979 | Makofka et al. | |
| 4,480,927 A | 11/1984 | Peat et al. | |
| 4,597,672 A | 7/1986 | Neier et al. | |
| 4,712,922 A | 12/1987 | Feterl | |
| 5,143,310 A | 9/1992 | Neier | |
| 5,265,809 A | 11/1993 | Kuhn et al. | |
| 5,622,323 A * | 4/1997 | Krueger et al. | 241/101.76 |
| 5,782,559 A | 7/1998 | Neier et al. | |
| 6,000,649 A * | 12/1999 | Loppoli | 241/260.1 |
| 6,203,185 B1 | 3/2001 | Neier | |
| 6,328,465 B1 * | 12/2001 | Tamminga | 366/314 |

FOREIGN PATENT DOCUMENTS

| WO | WO 93/16584 | 9/1993 |
|---|---|---|

* cited by examiner

*Primary Examiner*—Mark Rosenbaum
(74) *Attorney, Agent, or Firm*—McKee, Voorhees & Sease, P.L.C.

(57) ABSTRACT

The feed mixer of the present invention includes two upper horizontal augers having flighting thereon. Below and between the two upper augers is a rotor having helical paddle segments thereon. The two upper augers and the rotor all rotate in the same direction, but the two upper augers force material in one direction and the lower rotor forces material in the opposite direction. Knives on the outer edges of the upper augers and on the helical segments of the rotor act upon the hay to cut it and facilitate its mixing with other feed ingredients.

18 Claims, 6 Drawing Sheets

US 6,923,393 B1

HORIZONTAL FEED MIXER AND METHOD FOR USING SAME

CROSS-REFERENCE TO RELATED APPLICATIONS

This application claims benefit under 35 U.S.C. § 119(e) of provisional application 60/390,736 filed Jun. 21, 2002.

BACKGROUND OF THE INVENTION

The present invention relates to a horizontal feed mixer and method for processing hay bales. Specifically the present invention provides an apparatus and method for continuous processing of hay bales, mixing hay with other feed ingredients into a total mixed ration, and/or processing only hay bales, either in batches or continuously.

Various types of horizontal feed mixers have been provided. However, one difficulty encountered with horizontal feed mixers is the ability to process an entire bale without first chopping up the bale into smaller particles. This is particularly advantageous with the larger feed mixers where it is desirable to place an entire large round or square bale into the mixing box for mixing hay with other feed ingredients.

Therefore, a primary object of the present invention is the provision of an improved horizontal feed mixer and method for processing hay bales.

A further object of the present invention is the provision of a feed mixer that will process a whole bale of hay, even when larger round and square bales are used.

A further object of the present invention is the provision of a horizontal feed mixer and method for processing hay bales which provides thorough mixing of the feed ingredients and the hay in a minimum amount of time.

A further object of the present invention is the provision of an improved horizontal feed mixer and method for processing bales which can process large bales even when the strings holding the bales together remain in place.

A further object of the present invention is the provision of an improved horizontal feed mixer and method for processing hay bales which combines the process for chopping the bales into smaller ingredients and also the process for mixing the bales together with other feed ingredients.

A further object of the present invention is the provision of an improved horizontal feed mixer and method for processing hay bales which is economical to manufacture, durable in use and efficient in operation.

BRIEF SUMMARY OF THE INVENTION

The foregoing objects may be achieved by a horizontal mixer having two augers at the upper end of the mixing box and having a rotor positioned between the two augers and below them within the mixing box. The two upper augers have flighting and have a plurality of knives attached adjacent the outer edge of the flighting. The rotor is larger in diameter than the two upper augers and includes segmented paddles thereon rather than continuous flighting. The segmented paddles have knives adjacent their outer periphery for engaging and cutting the hay.

The two upper augers rotate in the same rotational direction or in opposite directions. The lower rotor can rotate in the same direction or the opposite direction as the two upper augers. The flightings on the upper augers are arranged so as to propel material toward one end of the mixing box away from the discharge area whereas the rotor below the two augers includes paddle segments which propel or drive the material in the opposite direction and toward the discharge area.

Shear bars are provided adjacent one of the augers and adjacent the rotor so as to increase the effectiveness of the knives as the knives pass closely adjacent the shear bars.

DETAILED DESCRIPTION OF THE INVENTION

Figure 1:
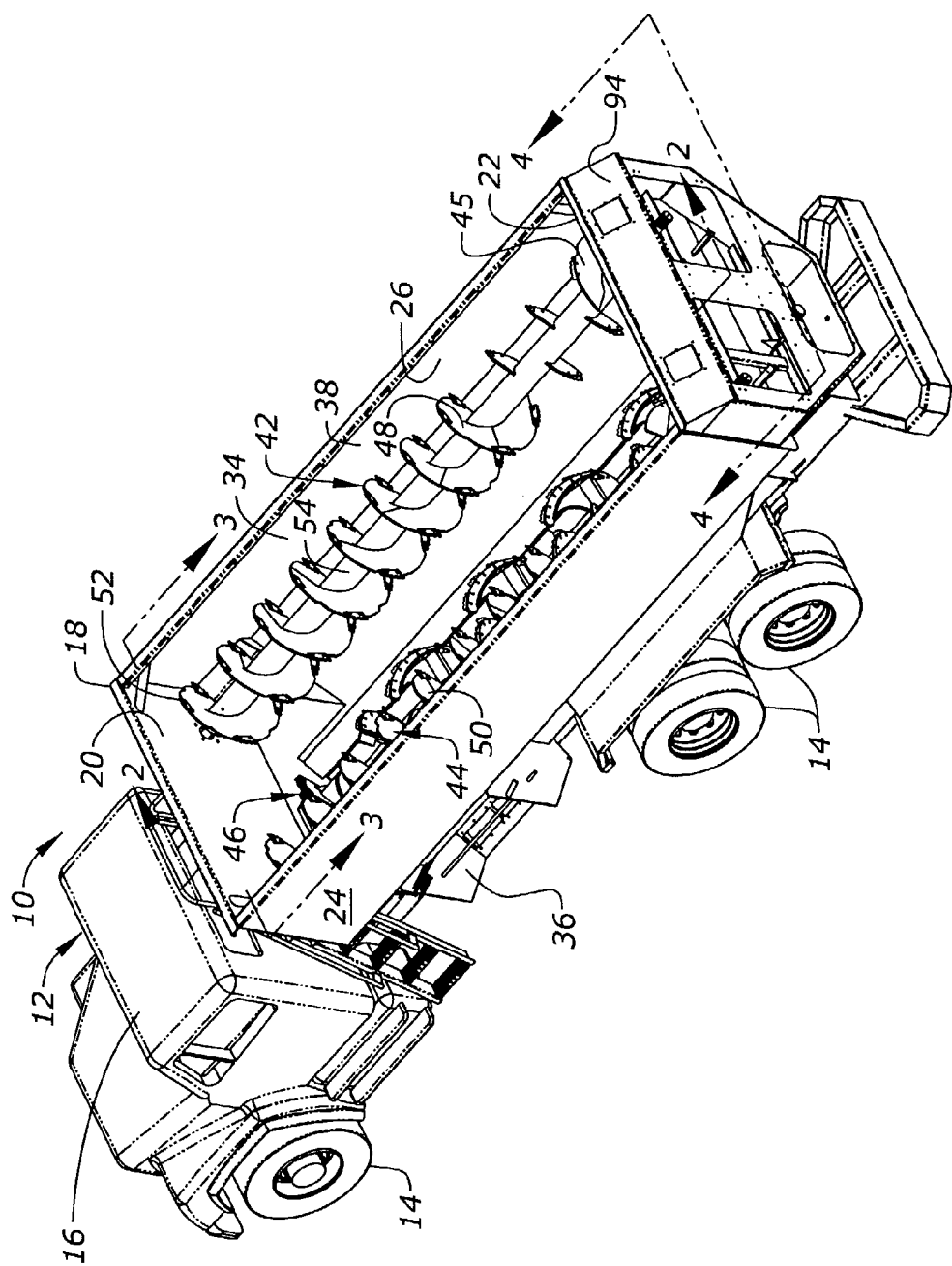
FIG. 1 is a perspective view of a truck having the mixing box of the present invention mounted thereon.

Referring to the drawings the numeral 10 refers generally to the feed mixer of the present invention. Mixer 10 is mounted on a truck 12, but it could just as easily be mounted upon a wagon frame or a stationary frame rather than a truck frame. Truck 12 includes wheels 14 a cab 16 and a mixing box 18 mounted thereon.

The mixing box includes a front wall 20, a rear wall 22, first and second vertical side walls 24, 26 (FIG. 3) and first and second inclined side walls 28, 30. Inclined side walls 28, 30 are joined at their lower ends by a curved apex 32 which is curved to conform to the rotor which will be described more full hereinafter. The mixing box 18 defines a mixing chamber 34 having an open upper end. Mixing box 18 also includes a discharge door 36 of conventional construction mounted on one of the side walls of the mixing box. The discharge door 36 can be lowered and opened to create a chute for discharging material from the mixer in conventional fashion. An additional discharge door can also be added on the opposite side of mixing box 18. A conveyor of suitable length (not shown) can be added to carry material away from the discharge door 36.

Figures 3, 3A:
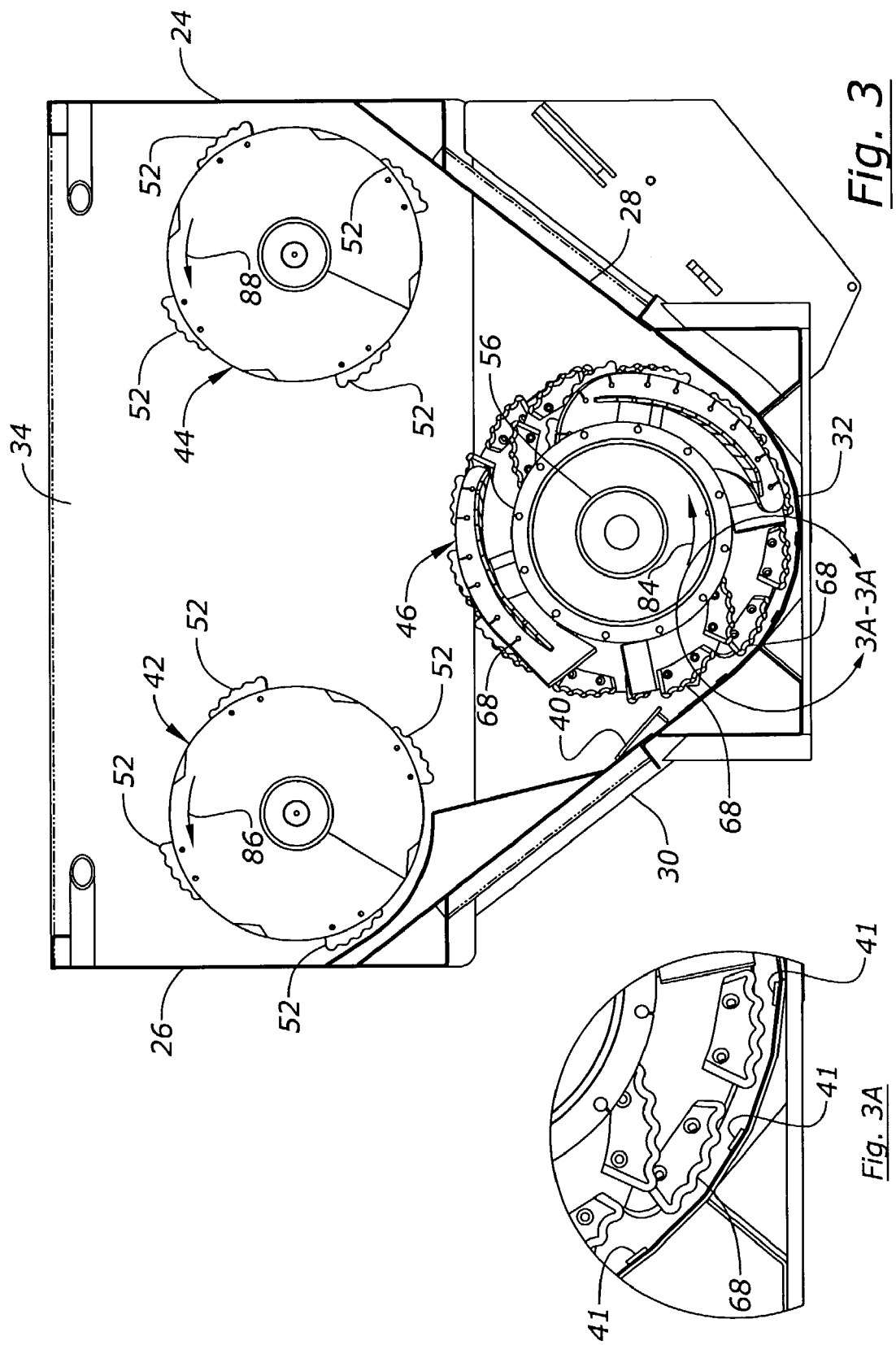
FIG. 3 is a cross sectional view taken along line 3—3 of FIG. 1.
FIG. 3A is an enlarged detail view taken along line 3A—3A of FIG. 3.

Referring to FIG. 3, within the mixing chamber 34 is a lower shear bar 40 on the inclined wall 30. The shear bar 40 is positioned adjacent the periphery of a rotor 46 within the chamber 34 for purposes described more fully hereinafter. Within the chamber 34 are a first upper auger 42 and a second upper auger 44. In the lower portion of the chamber 34 between the two upper augers 42, 44 is the rotor 46. Each of the upper augers 42, 44 include a first helical flighting 48 and a second helical flighting 50 respectively thereon. Flightings 48, 50 are the same. Attached to the outer peripheral edges of helical flightings 48, 50 are a plurality of serrated cutting blades 52. The upper augers 42, 44 include helical flightings or paddles 45 which are axially opposite the helical flightings 48, 50 respectively. Each of the augers 42, 44 includes a central shaft 54 extending along its longitudinal length. The augers 42, 44 are preferably rotated in the same rotational direction at different speeds from one another so that a bale placed on them will rotate and turn. They may also be rotated in opposite directions. The serrated cutting blades 52 facilitate cutting of the hay that is being placed within the mixer.

Figure 2:
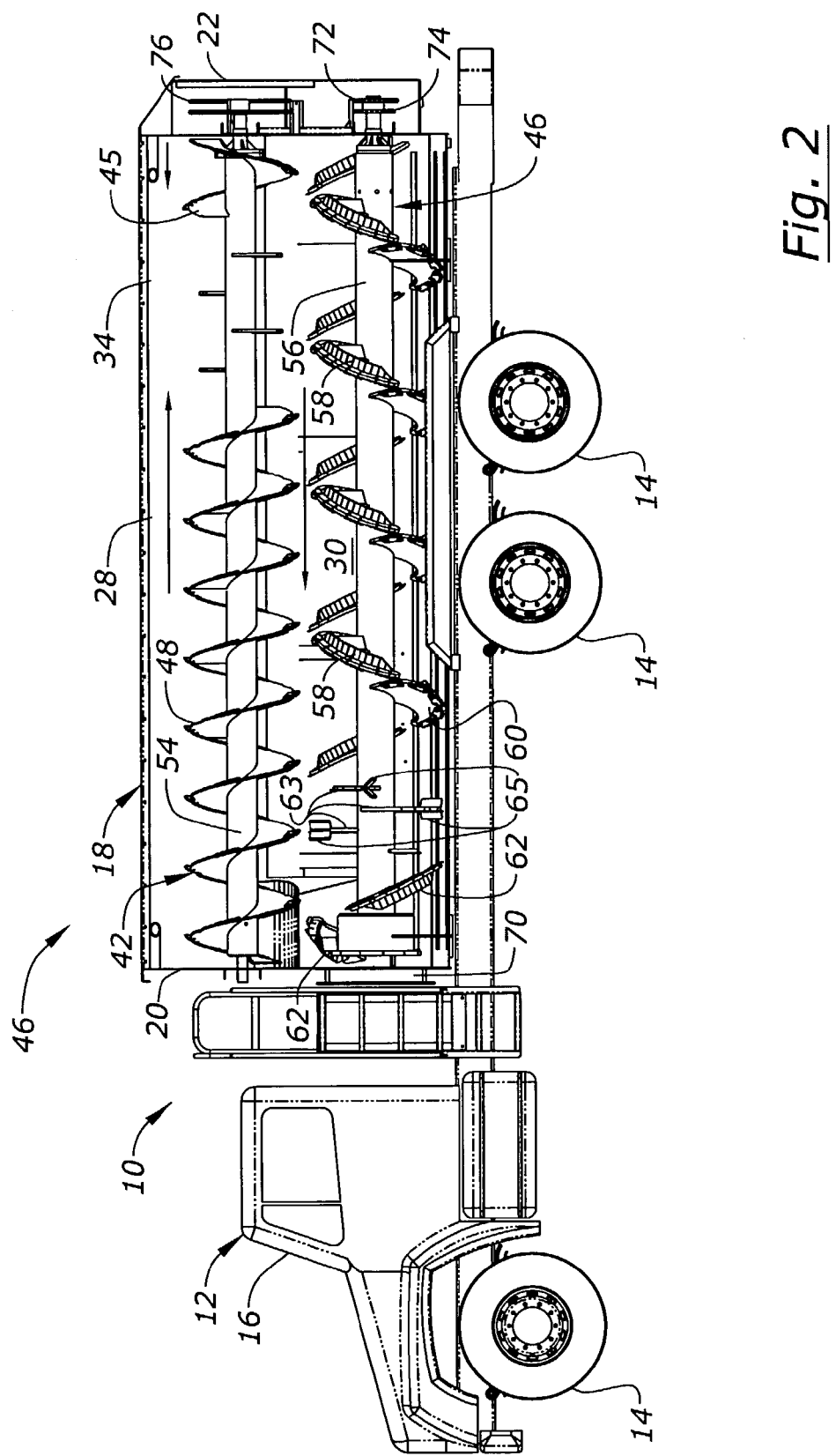
FIG. 2 is a longitudinal sectional view taken along line 2—2 of FIG. 1.
Figure 5:
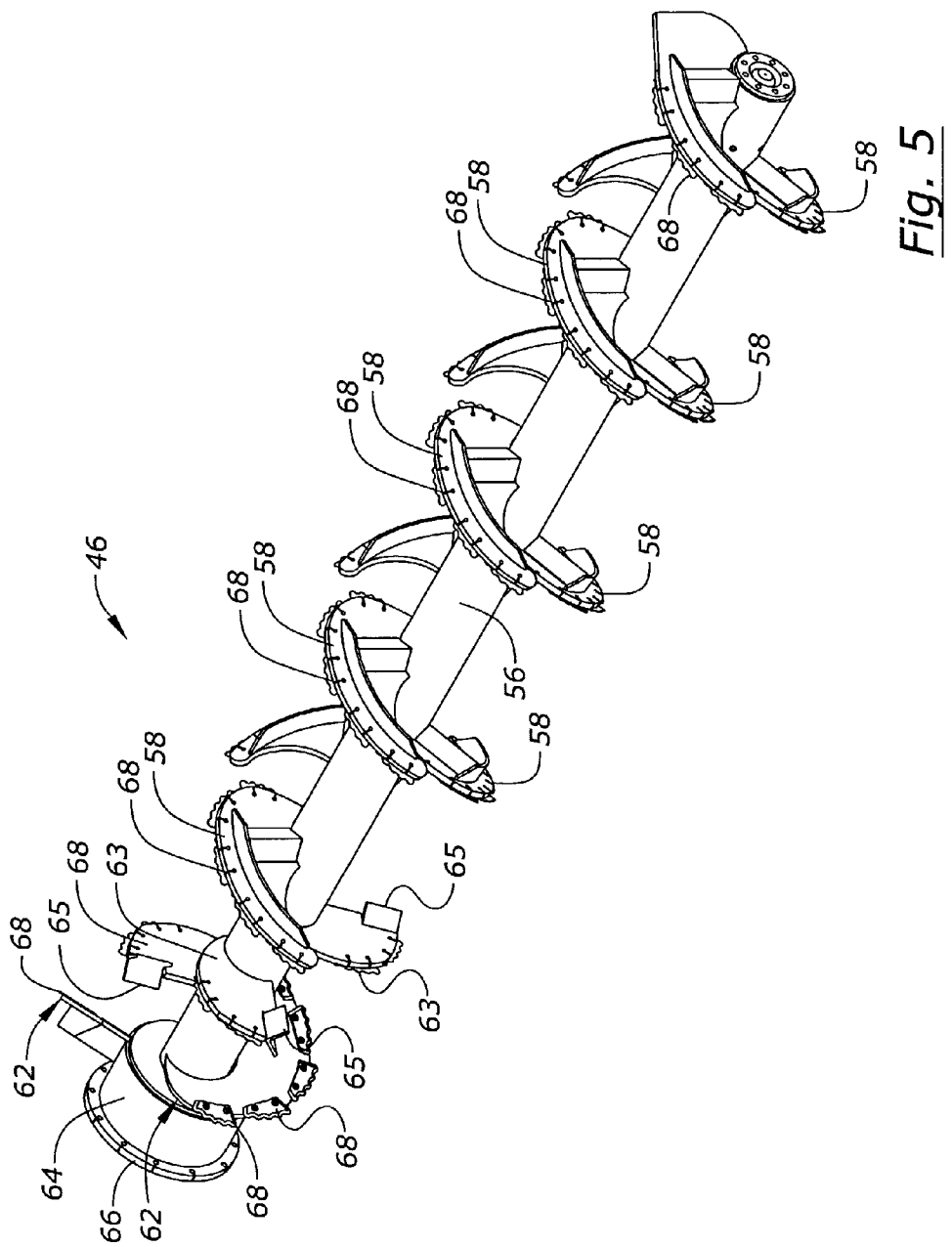
FIG. 5 is a perspective view of the rotor used in the present invention.

The rotor 46 includes a rotor tube 56 and a plurality of paddle segments 58. As can be seen in FIGS. 2 and 5, two end paddle segments 62 are positioned at the forward end of the rotor 46 near a hub 64 which includes a hub flange 66. Paddles 62 are inclined the opposite direction from paddles 58. Between paddles 62 and paddles 58 are a plurality of kickers 63 which are not inclined and which contain V-shaped kicker blades 65 at their outer leading edges.

Adjacent the outer peripheries of paddle segments 58, 62 are a plurality of serrated cutting blades 68. As can be seen in FIG. 3 these serrated cutting blades 68 pass in a circular path during rotation of the rotor 46 and pass closely adjacent the shear bar 40 so as to interact with the shear bar 40 and facilitate further cutting of the hay within the mixer. The paddle segments 58, 62 and the kickers 63 can have a varied number of cutting blades 68 to control particle size as well as the rate of cutting action.

Figure 5A:
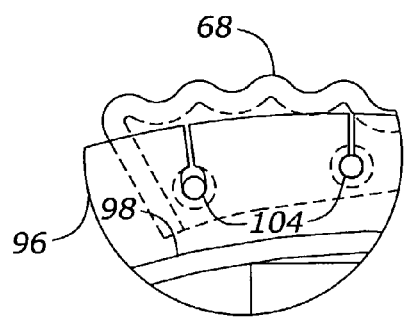
FIG. 5A is an enlarged detail view taken along line 5A of FIG. 5B.
Figure 5B:
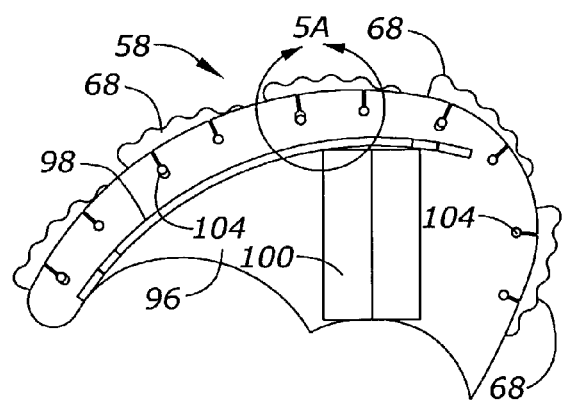
FIG. 5B is an enlarged perspective of the rotor paddle 58.

FIGS. 5A and 5B show the detail of the paddle segments 58. Each paddle segment 58 includes a helical flighting segment 96 having a curved flange 98 and an angle member 100 fixed thereto. Securing bolts adjustably secure the serrated cutting blades 68 to the flighting segment 98.

Figure 5C:
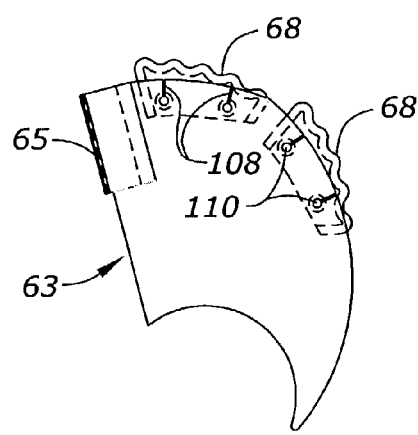
FIG. 5C is an enlarged elevational view of one of the kickers 63.
Figure 5D:
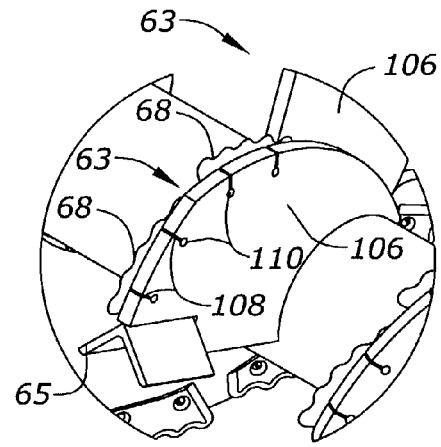
FIG. 5D is an enlarged pictorial detail of one of the kickers 63.

FIGS. 5C and 5D show the detail of the kickers 63. Each kicker 63 includes a helical blade 106 having a plurality of peripheral slots 108. The kicker blades 65 are V-shaped. The serrated cutting blades 68 are adjustably secured to the helical blade 106 by means of bolts 110.

The rotation of the rotor 46 is accomplished by means of a motor 70 mounted outside the front wall 20 of the mixing box 18. This motor may be a hydraulic motor or it may be an electric motor or it could be a motor driven by an internal combustion engine or a tractor PTO drive. Preferably it is a hydraulic motor. It is connected to the rotor tube 56 and rotates the rotor tube 56. As can be seen in FIG. 2 the rotor tube 56 has connected to its rear end a pair of drive sprockets 72, 74. Similarly the augers 42, 44 have adjacent their rear ends a first auger sprocket 76 and a second auger sprocket 78 respectively. These sprockets are located outside the rear wall 22. A continuous chain 80 is trained around drive sprocket 72 and the first auger drive sprocket 76. A continuous chain 82 is trained around drive sprocket 74 and second auger sprocket 78. The sprockets 72, 74, 76 and 78 all rotate in the same clockwise (FIG. 4) direction as indicated by arrows 84, 86, and 88. In FIG. 3, the same arrows 84, 86, 88 appear, but because the sectional view is looking in the opposite direction, the arrows 84, 86, 88 are all shown rotating in a counterclockwise direction as viewed from the front looking to the rear of the vehicle.

Figure 4:
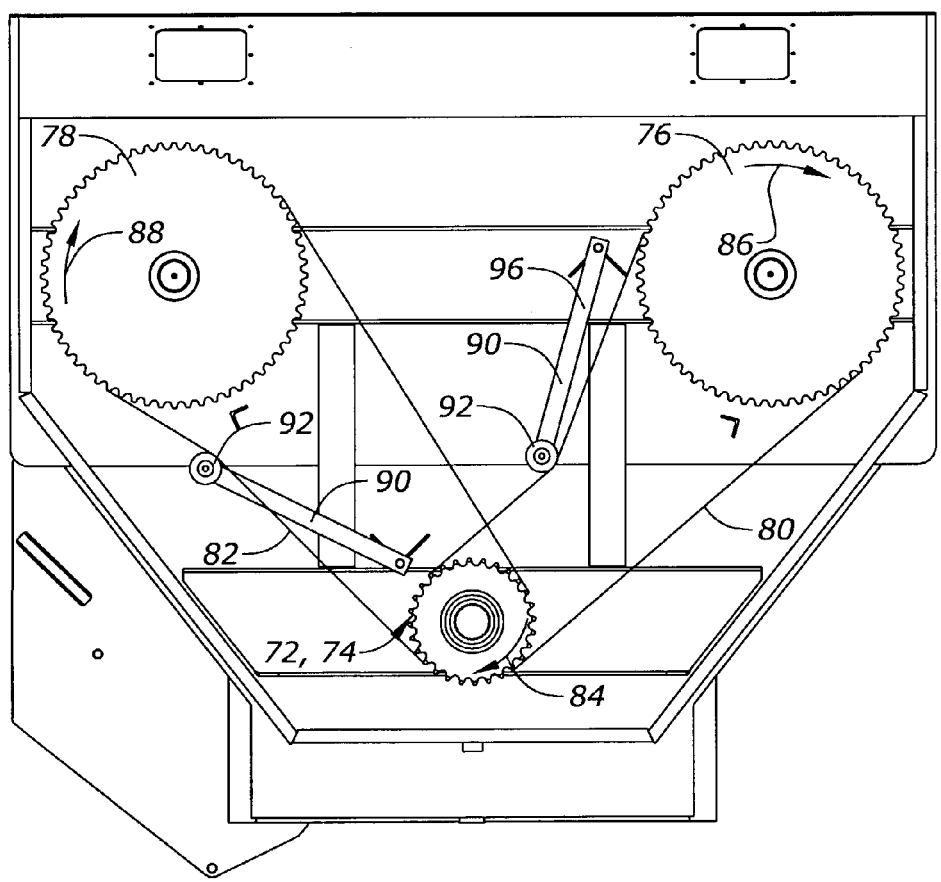
FIG. 4 is a cross sectional view taken along line 4—4 of FIG. 1.

A pair of spring arms 90 have idler pulleys 92 bearing against chains 80, 82 respectively so as to keep them in tight contact with the sprockets. As can be seen in FIG. 1 the entire chain and sprocket assembly is contained within a chain and sprocket housing 94. While the chain abnd sprocket drive system of FIG. 4 is preferred it is also possible to drive the sprockets 86, 88 in opposite directions. Furthermore it is preferred to make the sprockets 72, 74, 76, 78 differenmt sizes so that augers 42, 44 are driven at different speeds. This causes a hay bale to rotate while resting on augers 42, 44 when the augers 42, 44 rotate in the same direction.

The present invention is particularly advantageous for processing whole large bales either in a circular or a rectangular form with other feed ingredients. As can be seen in FIG. 2 the two upper augers 42, 44 force material away from the discharge door 36 whereas the lower rotor forces material toward the discharge door 36. The knives 52 of the upper augers 42, 44 cause cutting of the hay. The adjustable knives 68 of lower rotor 46 pass closely adjacent the shear bar 40 and shear bars 41 (FIG. 3A) to facilitate further cutting of the hay. It has been found with the present invention that large bales of hay may be cut into small particles even when the bales are inserted with strings in place. Furthermore, the hay is then mixed with other ingredients. A front-end loader can be used to insert first the hay and then other ingredients into the mixing box. The mixer can be used to process only hay or it can be used to process hay and mix it with other ingredients to create a fully mixed feed ration.

Of importance is the fact that the two upper augers particularly rotate in the same rotational direction. Preferably the two upper augers are rotated at different speeds so that a hay bale placed on them will be turned by the two upper augers at the same time it is being rotated. This allows the top auger knives to cut and tear the bale so that it drops down to the bottom rotor. This results in the best cutting action on a bale that is placed into the mixing box 18.

After the hay and feed have been cut and mixed together, the truck 12 may be driven along a feeding bunk and the discharge door 36 opened. The continued rotation of the augers and rotor within the mixer causes the material to be fed outwardly through the door 36 and into the bunks. Thus it can be seen that the device accomplishes at least all of its stated objectives.

What is claimed is:

1. A horizontal feed mixer for cutting and mixing a hay bale with other feed ingredients comprising:

a mixer box having side walls, end walls and a bottom wall forming a mixer chamber having an open upper end;

first and second augers mounted within the mixer chamber for rotation about first and second auger axes respectively;

a rotor mounted within the mixer chamber for rotation about a rotor axis;

drive mechanism connected to the rotor and the first and second augers for rotation about the rotor axis, the first auger axis, and the second auger axis, respectively;

the rotor having a rotor diameter and a plurality of helical segments thereon;

the first and second augers having first and second auger helical flightings, respectively, and having first and second auger diameters, respectively, that are smaller than the rotor diameter;

the first and second augers being above the rotor within the mixer chamber;

a plurality of knives mounted on the helical segments of the rotor and on the first and second helical flightings of the first and second augers, whereby the hay bale introduced to the upper end of the mixer chamber will first encounter the knives of the first and second augers and be cut and chopped into pieces which will fall to the rotor and be further cut by the knives on the helical segments of the rotor.

2. The horizontal feed mixer of claim 1 and further comprising one or more shear bars mounted on the side walls of the mixer and protruding within the mixer chamber for cooperating with the knives of at least some of the first and second augers and the rotor to facilitate the cutting of the hay bale.

3. The horizontal feed mixer of claim 2 wherein the knives of at least one of the first and second augers or the rotor pass closely adjacent the one or more shear bars during rotation of the first and second augers and the rotor.

4. The horizontal feed mixer of claim 3 wherein the knives are adjustably attached to the first and second augers and the rotor for adjustment in an inner radial direction or an outer radial direction with respect to the first and second auger axes and the rotor axis, respectively.

5. The horizontal feed mixer of claim 1 wherein the rotor comprises and elongated rotor shaft, the helical segments being divided into first and second groups that are attached in axially spaced relation to one another to create a central space there between along the elongated rotor.

6. The horizontal feed mixer of claim 5 wherein the first group of helical segments extend in a first helical direction and the second group of helical segments extend in a second helical direction opposite from the first helical direction whereby rotation of the rotor causes material to be moved toward the central space.

7. The horizontal feed mixer of claim 6 wherein a plurality of kicker bars are mounted to the rotor shaft in the central space.

8. The horizontal feed mixer of claim 7 wherein the mixer box includes a discharge opening adjacent the central space and a discharge door movable from a closed position in covering relation over the discharge opening to an open position permitting material to be discharged from within the mixing chamber through the discharge opening.

9. The horizontal mixer of claim 1 wherein the first and second augers and the rotor are the only members mounted for rotation within the mixer chamber.

10. The horizontal mixer of claim 1 wherein the drive mechanism rotates the first and second augers in a first rotational direction and the rotor in a second rotational direction opposite from the first rotational direction.

11. The horizontal mixer of claim 10 wherein the drive mechanism drives the first auger at a first rotational speed and the second auger at a second rotational speed that is slower than the first rotational speed whereby the hay bale will rotate while resting on the rotating first and second augers.

12. The horizontal mixer of claim 1 wherein the drive mechanism drives the first auger in a first rotational direction and the second auger in a second rotational direction opposite from the first rotational direction.

13. A method for cutting a hay bale and mixing the hay bale with other ingredients comprising:

taking a mixer box comprising side walls, end walls, and a bottom wall forming a mixer chamber having an open upper end; a first auger, a second auger, and a rotor being mounted for rotation within the mixer chamber; the first and second augers being positioned above the rotor within the mixer chamber; the first and second augers and the rotor each comprising an elongated shaft and one or more helical members attached to the shaft along the length thereof; and a plurality of knives being attached to the helical members;

rotating the first and second augers and the rotor about a first auger axis, as second auger axis, and a rotor axis, respectively, within the mixing chamber;

placing a hay bale through the open end of the mixer chamber onto the rotating first and second augers whereby the knives on the helical members of the first and second augers cut the hay bale into pieces;

further chopping the pieces of the hay bale into smaller pieces by the knives on the helical members of the rotating rotor;

recirculating the pieces and the smaller pieces of the hay bale back and forth between the first and second augers and the rotor to cause further chopping thereof into even smaller pieces; and discharging the chopped hay bale through a discharge opening in the mixer box after the hay bale has been chopped into pieces of desired fineness.

14. The method according to claim 13 and further comprising rotating the first auger and second augers in the same first direction, but at different rotational speeds whereby the hay bale will rotate while resting on the first and second augers.

15. The method according to claim 14 and further comprising rotating the rotor in a second direction opposite from the first direction.

16. The method according to claim 13 and further comprising rotating the first auger in a first direction and rotating the second auger in a second direction opposite from the first direction.

17. The method according to claim 13 and further comprising mixing other feed ingredients with the chopped pieces of the hay bale before the discharging step.

18. The method according to claim 13 and further comprising using shear bars on the side walls of the box to cooperate with the knives of at least one of the rotating first and second augers and the rotor that pass closely adjacent the shear bars during rotation of the first auger, second auger and rotor.

* * * * *